Figure 1:
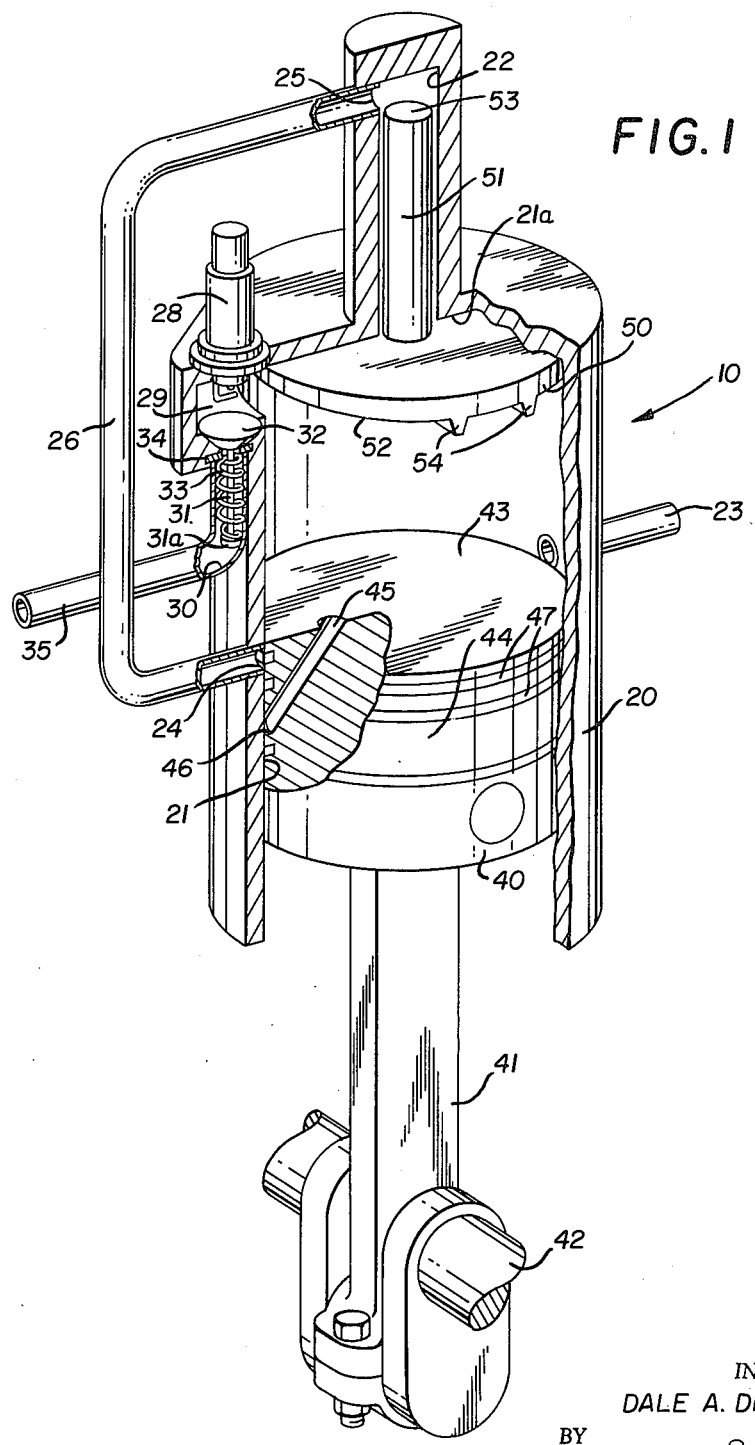

Aug. 10, 1965  D. A. DREISBACH  3,199,497
INTERNAL COMBUSTION ENGINE HAVING BY-PASS FOR AUTOMATICALLY
ACTUATING AN AUXILIARY SCAVENGER PISTON
Filed Jan. 24, 1963  6 Sheets-Sheet 1

INVENTOR.
DALE A. DREISBACH
BY
*[signature]*
ATTORNEY

Aug. 10, 1965   D. A. DREISBACH   3,199,497
INTERNAL COMBUSTION ENGINE HAVING BY-PASS FOR AUTOMATICALLY
ACTUATING AN AUXILIARY SCAVENGER PISTON
Filed Jan. 24, 1963   6 Sheets-Sheet 2

INVENTOR.
DALE A. DREISBACH
BY
*J. William Freeman*
ATTORNEY

Aug. 10, 1965  D. A. DREISBACH  3,199,497
INTERNAL COMBUSTION ENGINE HAVING BY-PASS FOR AUTOMATICALLY
ACTUATING AN AUXILIARY SCAVENGER PISTON
Filed Jan. 24, 1963  6 Sheets-Sheet 3

INVENTOR.
DALE A. DREISBACH
BY
*Guillian Freeman*
ATTORNEY

Aug. 10, 1965 D. A. DREISBACH 3,199,497
INTERNAL COMBUSTION ENGINE HAVING BY-PASS FOR AUTOMATICALLY
ACTUATING AN AUXILIARY SCAVENGER PISTON
Filed Jan. 24, 1963 6 Sheets-Sheet 4

INVENTOR.
DALE A. DREISBACH
BY
*J. William Freeman*
ATTORNEY

Aug. 10, 1965   D. A. DREISBACH   3,199,497
INTERNAL COMBUSTION ENGINE HAVING BY-PASS FOR AUTOMATICALLY
ACTUATING AN AUXILIARY SCAVENGER PISTON
Filed Jan. 24, 1963   6 Sheets-Sheet 5

INVENTOR.
DALE A. DREISBACH
BY
*[signature]*
ATTORNEY

Aug. 10, 1965 D. A. DREISBACH 3,199,497
INTERNAL COMBUSTION ENGINE HAVING BY-PASS FOR AUTOMATICALLY
ACTUATING AN AUXILIARY SCAVENGER PISTON
Filed Jan. 24, 1963 6 Sheets-Sheet 6

INVENTOR.
DALE A. DREISBACH
BY
ATTORNEY

United States Patent Office 3,199,497
Patented Aug. 10, 1965

3,199,497
INTERNAL COMBUSTION ENGINE HAVING BY-PASS FOR AUTOMATICALLY ACTUATING AN AUXILIARY SCAVENGER PISTON
Dale A. Dreisbach, 6768 Hinsdale St., Hiram, Ohio
Filed Jan. 24, 1963, Ser. No. 253,645
8 Claims. (Cl. 123—66)

This invention relates to the art of internal combustion engines and in particular relates to an internal combustion engine of the type wherein an auxiliary, or scavenger piston is employed for the purpose of providing one power stroke during each cycle of operation.

Internal combustion engines of this type are well known in the art and, in essence, comprise a primary piston that is operated by ignited gas in conventional fashion, together with a secondary or auxiliary piston that moves in timed coaction with the primary piston, with the auxiliary piston performing certain of the functions that are normally performed by the single piston of a four stroke cycle engine.

From the above, it is manifest that timed coaction between the reciprocal movements of the primary and auxiliary pistons is required for effective operation and to this end, in the past, such timed coaction has been achieved by the use of linkages, cams, chain drives, and other types of mechanical connections. The difficulties attendant to the use of such mechanical connections are believed apparent, since the same are subject to high wear and mechanical malfunction, with the results that the utility of engines of this type has been somewhat limited in the past.

It has been discovered that the aforementioned disadvantages can be obviated by providing a freely reciprocating auxiliary piston which is not connected to the main piston in any way. Furthermore, it has been found that by-pass means that serve to divert a portion of the ignited pressurized gases around the primary piston to a point above the secondary piston can be utilized with the pressure of these diverted gases being applied to the upper face of the auxiliary piston so as to propel the same downwardly after the primary piston has completed a predetermined portion of its power stroke. This controlled downward movement of the auxiliary piston permits the auxiliary piston to perform the dual function of sweeping out the spent gas above the downwardly traveling primary piston, while simultaneously drawing in a fresh charge of fuel to be ignited upon return of the primary and secondary pistons to igniting position.

Production of an improved internal combustion engine having the above advantages accordingly becomes the principal object of this invention, with other objects thereof becoming more apparent upon a reading of the following brief specification, considered and interpreted in the light of the accompanying drawings.

Of the drawings:

FIGURE 1 is a perspective view broken away and in section and showing the construction of the improved internal combustion engine.

FIGURES 2 through 10, inclusive, are sectional views showing the position of the component parts of the internal combustion engine in various phases of operation.

Referring now to the drawings and in particular to FIGURE 1, the improved internal combustion engine, generally designated by the numeral 10, is shown including a cylindrical body portion 20 that defines a main combustion chamber 21 of cylindrical configuration, as well as an auxiliary cylindrical chamber 22 that is shown concentrically disposed with respect to the chamber 21, with the chamber 22 slidably receiving the piston rod 51 of the auxiliary piston, as shown in FIGURE 1 and as will be described in greater detail at a later point.

The main combustion chamber 21 includes an exhaust port 23 and by-pass port 24 which is preferably located just below the horizontal plane of the exhaust port 23, as is clearly shown in FIGURES 2 through 10 of the drawings. The chamber 21 also has an adjacent zone 29 that serves the dual function of (1) acting as a by-pass chamber and (2) acting as an ignition chamber, as will be subsequently described in greater detail. A second by-pass port 25 opens into the upper end of the auxiliary chamber 22, as shown in FIGURES 2 through 8 and these by-pass ports 24 and 25 are connected by a by-pass conduit 26.

A spark plug 28 is disposed on the cylindrical body portion 20 and extends into the zone 29 that is provided at the upper end of the main combustion chamber 21, while inlet port 30 opens into the upper end of the main combustion chamber 21 as shown in FIGURES 1 through 8.

In this regard, the inlet port 30 may be of any conventional construction, such as a reed valve, with the drawings illustrating a port 30 that is normally sealed against the entrance of fluid by the use of a valve stem 31 whose head 32 is normally urged into the seated position of FIGURES 2 through 6 by a spring 33 which seats against washer 34 and lower head portion 31a of valve stem 31, with the usual supply line 35 supplying the inlet port 30 with fluid as required.

The primary piston 40 is of an appropriate diameter to be reciprocal within the chamber 21, with the peripheral edge thereof being received against the circular walls of the combustion chamber 21. In this regard, it is understood that the piston 40 is only slightly spaced from the walls of the cylinder in conformity with normal requirements for free movement with the spacing shown in the drawings being exaggerated for purposes of illustration. The piston 40 also has the usual connecting rod 41 attached to it and journaled about an eccentric arm 42 so as to cause the piston 40 to reciprocate between the upper limit shown in FIGURE 2 and the lower limit shown in FIGURE 7 of the drawings.

The piston 40 further has a top surface 43 as well as a peripheral edge surface 44 and a bore or opening 45 which extends downwardly and outwardly from the top surface 43 at an angle so as to open into the peripheral edge 44 as shown in the drawings, with the opening in edge 44 being designated by the numeral 46.

The usual packing rings 47, 47 are disposed in the periphery of the piston to prevent the escape of gas between the peripheral edge of the piston and the wall of the combustion chamber 21. These rings are designed in conventional fashion to obtain the desired sliding contact with the walls of the chamber in known manner.

The auxiliary piston has been designed for free reciprocation in the auxiliary chamber 22 and accordingly includes a piston head 50 and a piston rod 51. It is to be understood that the auxiliary piston rod 51 is spaced slightly from the walls of the chamber 22 to permit free reciprocal movement of the rod within the chamber, with this spacing also being exaggerated in the drawings for clarity of illustration.

The piston head 50 further has a lower surface 52, while the piston rod 51 has an upper surface 53 that defines the upper face of the auxiliary piston for the purpose of this invention. Protuberances 54, 54 project from the surfaces 52 for the purpose of providing spacing between the primary and auxiliary pistons as shown in FIGURES 2 and 8 through 10 of the drawings.

In addition to the components just described, the auxiliary piston head 50 may be undercut at 55 (FIGURES 2 through 10) adjacent zone 29 to permit the passage of gases from chamber 29 into chamber 21. Conventional key and groove means (not shown) may be provided between piston rod 51 and chamber 22 to insure registry between undercut 55 and zone 29, while permitting relative axial movement between rod 51 and chamber 22.

In use or operation of the improved internal combustion engine, it will first be assumed that the component parts have been assembled as shown in FIGURE 1 of the drawings. It will further be assumed that the component parts are in the specific positions shown in FIGURE 2 of the drawings.

Figure 2:
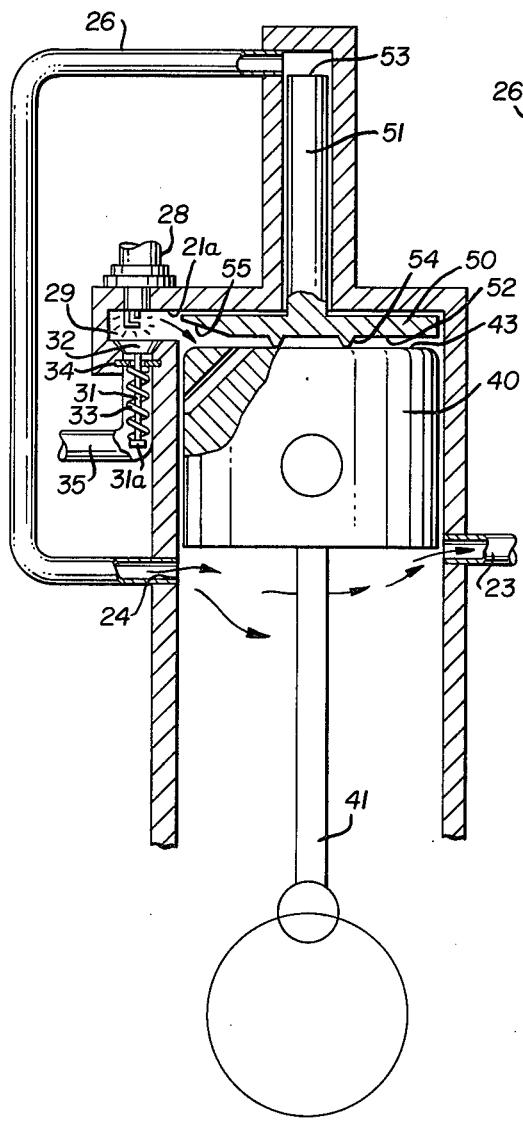

When the parts have been assembled as in FIGURE 2, they are in what may be called the ignition position. Accordingly, the primary piston 40 and the auxiliary piston 50 are both positioned in the extreme upward position with further upward movement of the auxiliary piston 50 being prevented by the top wall 21a of the cylinder, while the main piston 40 is prevented from further upward movement by virtue of the fact that the crank has reached the top of its stroke. It should also be noted that at this time, the protuberances 54, 54 abut the top surface 53 of the main piston 40, as shown in FIGURE 2, thereby spacing surface 52 from top surface 43. Thus, a firing zone 29 is created in the chamber and between the top of the main piston 40 and the bottom surface 52 of the auxiliary piston.

With the parts in this position, it will be assumed that a predetermined amount of combustible gas has been compressed into the firing zone as shown by the arrow in FIGURE 2. The position of the other parts at this stage should also be kept in mind, with the valve 32 being closed and the by-pass and exhaust ports 23, 24 being open, thus allowing any gas trapped in conduit 26 from the preceding cycle to be evacuated.

Figure 3:
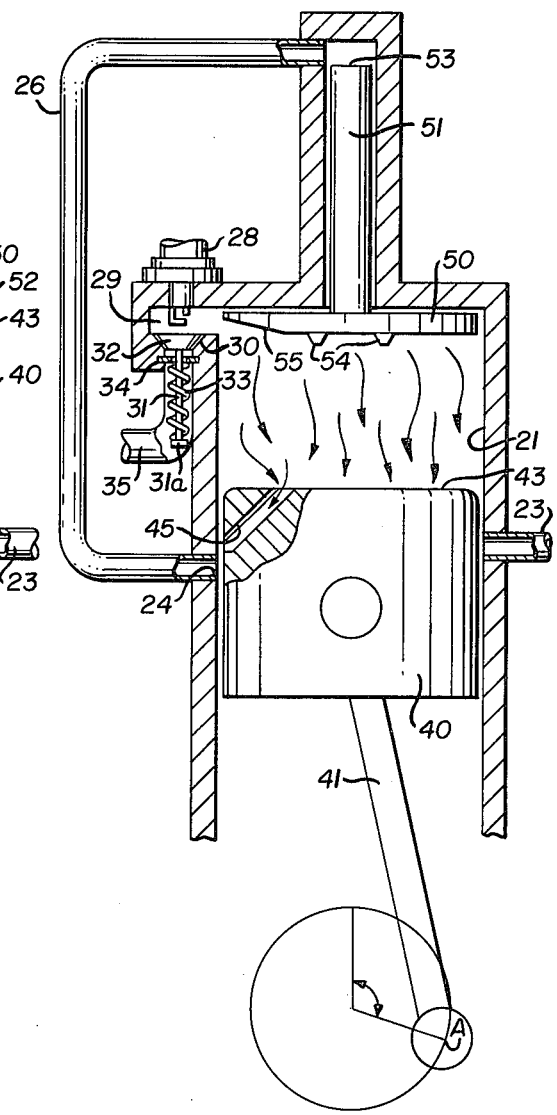

Turning next to FIGURE 3, this figure shows the position of the parts immediately following ignition. Upon ignition of the gases trapped in the firing zone 29 by the spark plug 28, the main piston 40 has been driven downward in the combustion chamber 21 by the force of the explosion and the eccentric arm 42 has rotated to position A which is approximately 112 degrees from FIGURE 2. It will be noted at this time that the same expanding gases which drive the main piston 40 down will serve to retain the auxiliary piston 50 in its original position against the top of the chamber 21. It should also be noted that some of the ignited gas has entered in the bore 45 of the main piston and that the by-pass and exhaust ports 23, 24 have become closed.

Figure 4:
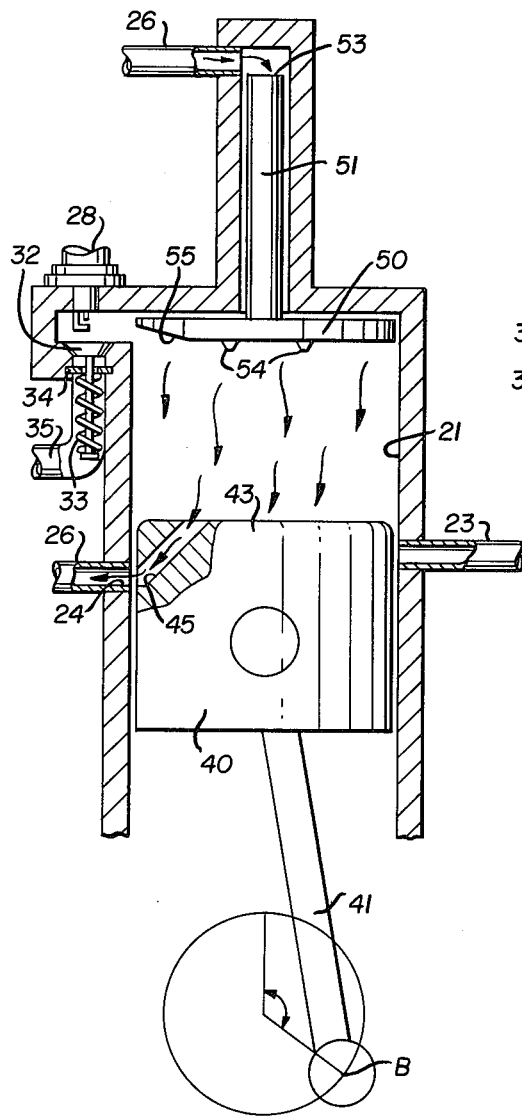

Turning next to FIGURE 4, it will be noted that the main piston 40 has now been driven further downward so that the eccentric arm has now rotated approximately 128 degrees from FIGURE 2 to position B. At this time, it will be seen that the gases formerly trapped in the bore 45 are now permitted to be expelled through the by-pass port 24 due to the fact that the bore 45 and the by-pass port 24 are now in registry. These gases pass through the conduit 26 and exert pressure on the top of the auxiliary piston rod 51. However, at this stage, this pressure is not sufficient to move the auxiliary piston from its original position by overcoming the pressure on its bottom surface.

Figure 5:
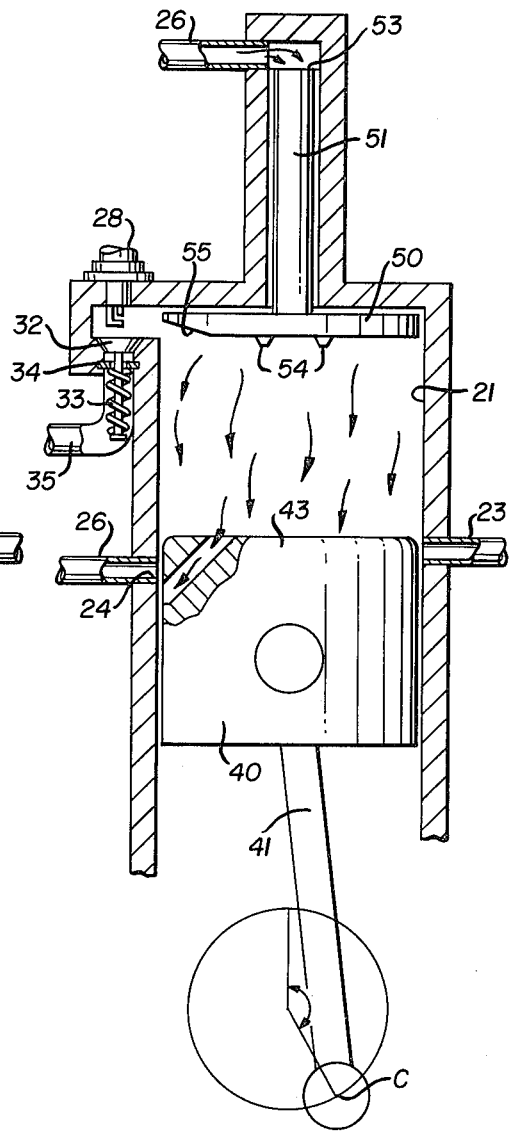

In the position shown in FIGURE 5, it will be noted that the main piston 40 has now moved downward so that the eccentric arm 42 has been rotated approximately 149 degrees from FIGURE 2 to position C. At this stage, both the by-pass and exhaust ports 23, 24 are still closed and the gas trapped in the conduit 26 is still exerting pressure on the top of the auxiliary piston rod 51. At this point, this pressure is still not great enough to overcome appreciably the upward pressure of the exploding gas in the main combustion chamber 21.

Figure 6:
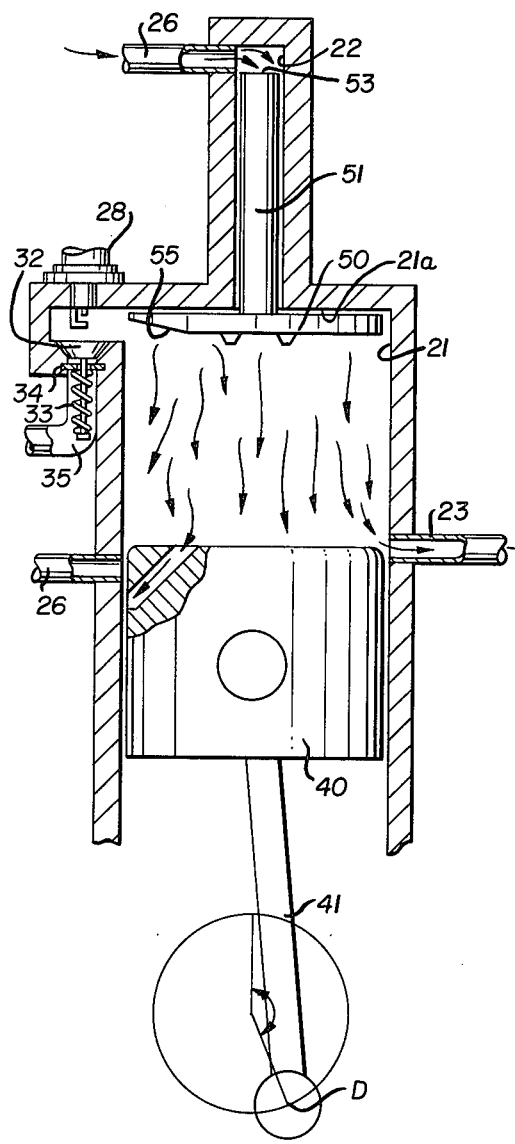

In the phase depicted in FIGURE 6, the main piston has moved downward so that the eccentric arm has now been rotated approximately 157 degrees from the position of FIGURE 2 to position D, with this downward movement being such that the exhaust port 23 is now partially open and the gas trapped in the main combustion chamber may now exit through the exhaust port, thereby diminishing the pressure in the chamber 22 which has served to retain the auxiliary piston essentially in its original position.

Figure 7:
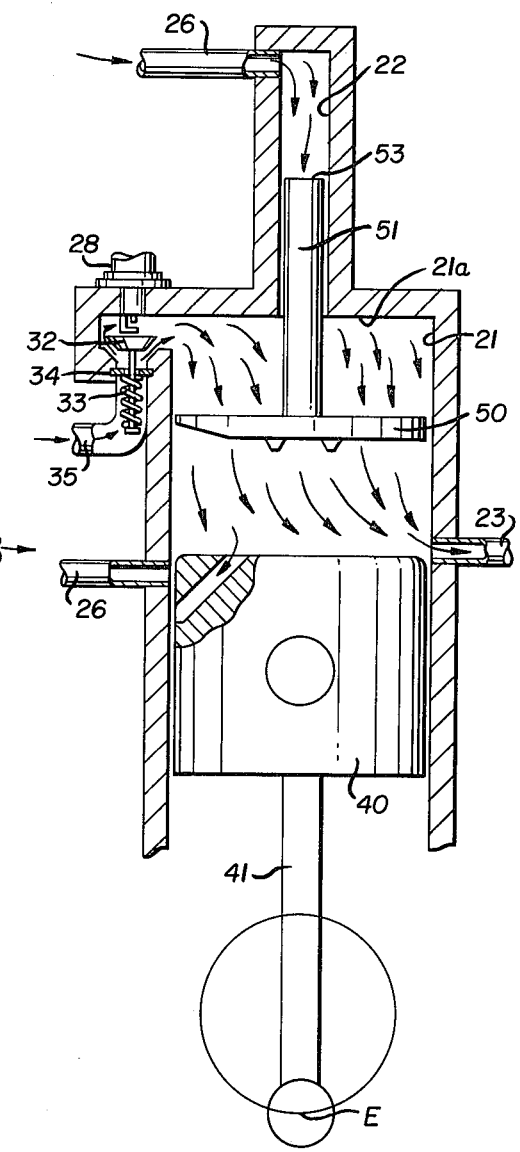

In FIGURE 7, the main piston has continued downward to its lowest position so that the exhaust port is now completely open and the eccentric arm has rotated approximately 180 degrees from FIGURE 2 to position E. At this time, it will be noted that the gases previously trapped in the by-pass conduit and exerting pressure on the top of auxiliary piston rod 51 are now exerting sufficient pressure to force the auxiliary piston 50 out of its original position.

At this time, it will also be noted that the main combustion chamber has been divided into two subchambers, with this first such subchamber being formed by the bottom of the auxiliary piston head 50 and the top of the main piston 40. In this subchamber, the expanded gases are being driven out through the exhaust port 23 by the downward movement of auxiliary piston 50. At the same time, another subchamber has been created between the top surface of the auxiliary piston head and the top 21a of the main combustion chamber 21. Due to the downward movement of the auxiliary piston head, a suction is created in this subchamber which causes the opening of the valve 32 by overcoming the force of the spring 33. This permits gas to be drawn in through the supply line 35 and thus through the valve 32 and into the subcompartment formed by the top of the main combustion chamber and the auxiliary piston head.

Figure 8:
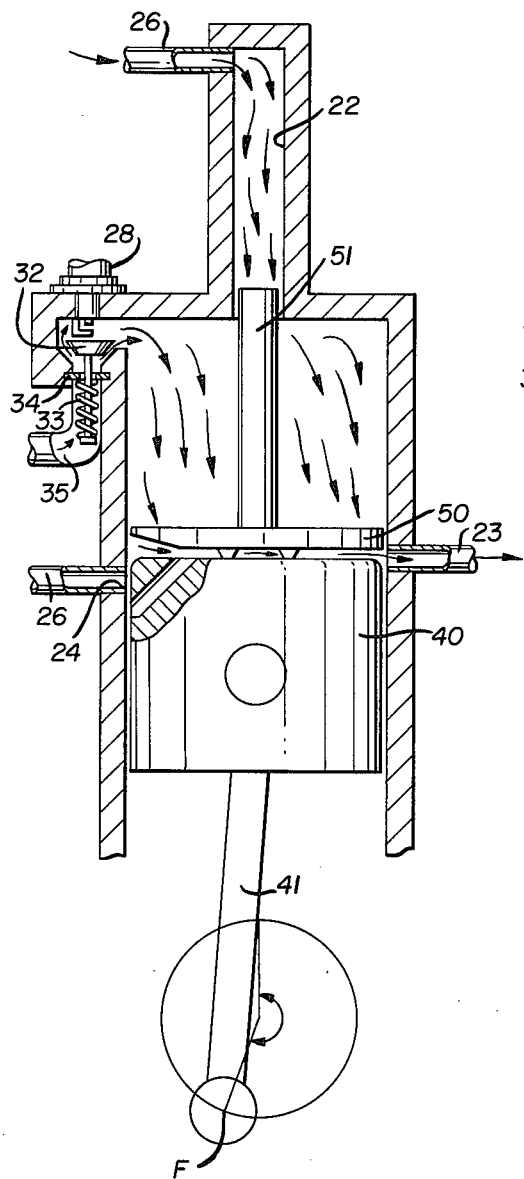

In FIGURE 8, it will be seen that the main piston 40 and the auxiliary piston 50 are in contact with each other. The eccentric arm has rotated approximately 199 degrees from FIGURE 2 to position F and the main piston and auxiliary piston have both started to move upward. At this time, the exhaust port is still partially open permitting the remainder of the gases trapped between the main and auxiliary pistons to be expelled. The valve 32 will now start to close to terminate the entry of fluid into the subcompartment formed by the auxiliary piston and the top of the main combustion chamber to be filled.

Figure 9:
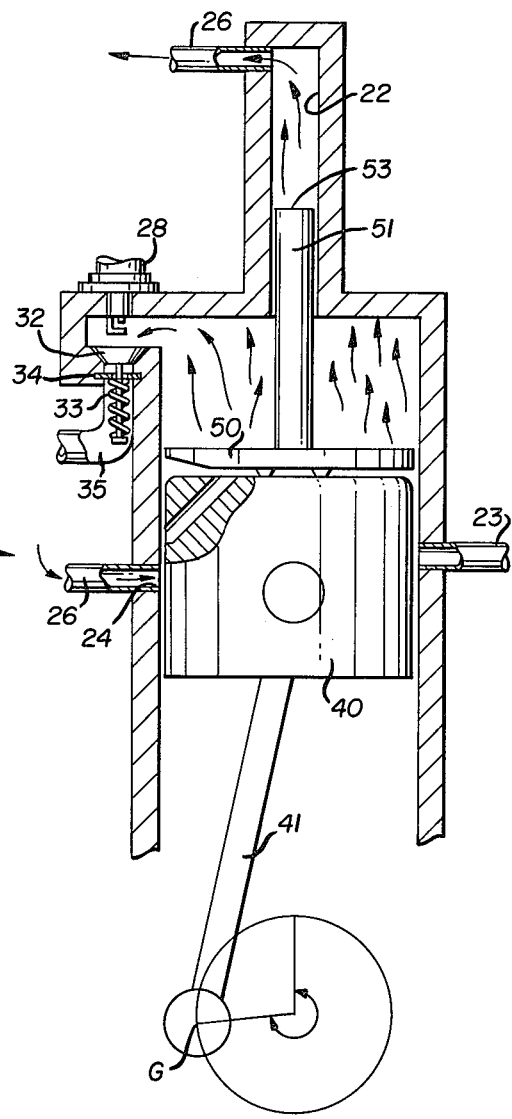

In FIGURE 9, it will be seen that the eccentric arm has rotated approximately 265 degrees from FIGURE 2 to position G and the main and auxiliary pistons have moved upward so as to close the exhaust port. This upward movement also has halted the vacuum effect caused by the auxiliary piston, thereby allowing the valve 32 to be closed by the spring 33. The same upward movement has the effect of compressing the gas trapped between the main and auxiliary pistons and the top of the main combustion chamber.

It should also be noted at this time that the remainder of the gases in the auxiliary chamber 22 is forced back through the by-pass conduit 26 by the upward movement of the auxiliary piston rod 51. This gas is momentarily trapped therein due to the fact that the by-pass port 24 is still closed.

Figure 10:
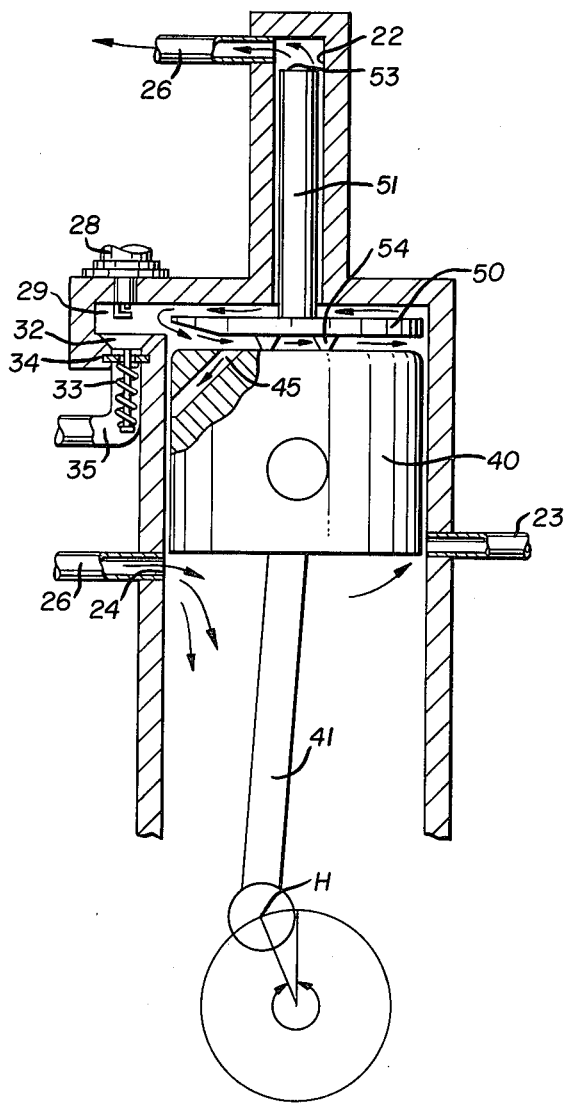

In FIGURE 10, it will be noted that the eccentric arm has rotated approximately 338 degrees from FIGURE 2 to position H and the component parts have almost returned to the position of FIGURE 2. At this time it can be seen that the by-pass port 24 is open, allowing the gas trapped in the conduit 26 to escape into the lower portion of the main combustion chamber toward the crank case.

It will also be noted that the gases trapped between the top of the auxiliary piston and the top of the main chamber are forced into the auxiliary zone 29 and thus into the chamber formed between the main and auxiliary pistons. This zone 29 is necessary to permit the gas to escape from between the auxiliary piston head and the top of the combustion chamber. As previously noted, the protuberances 54 preclude the main and auxiliary pistons from abutting and provide a chamber between them.

Upon further rotation of the eccentric arm, a full 360 degrees, the parts will be returned to the position shown in FIGURE 2. At this time, both the by-pass and exhaust ports 24, 23 are open and the remaining gas trapped in the by-pass conduit 26 can be expelled through the exhaust port. Also at this time, a predetermined amount of gas has been compressed in the firing zone 29 and the engine is in condition for the initiation of another power stroke, as just described, upon the ignition of these gases by the spark plug 28.

In connection with the above, it is noted that the axial speed and movement of main piston 40 is controlled by crank 42, while auxiliary piston 50 is not controlled by any such means and is freely reciprocal. Accordingly, it is noted that auxiliary piston 50 will move at a much higher speed than main piston 40 during its downward movement.

With regard to the degrees of rotation described in connection with positions A through H of FIGURES 2 through 10, it is noted that these figures have been given as approximate. Thus, they are utilized only for illustration purposes and the invention is not intended to be limited to the specific degrees shown.

Thus, it can be seen that by virtue of the timed co-action between the main piston and the auxiliary piston it is possible to obtain a power stroke in each cycle. This has been accomplished by having the auxiliary piston perform the suction and exhaust functions normally accomplished by separate strokes of the main piston and has further been accomplished without any mechanical connection between the main and auxiliary pistons.

The net effect of the above is the production of an engine that in two cycles of operation produces the effect of a four cycle engine. The attainment of this advantage does not require the admixture of the oil and gas together as is the case in normal two cycle engine operations, since the oil can be provided in the crank case as is obvious from the aforementioned description and does not need to be a constituent of the fuel being utilized as is normally the case in the operation of two cycle engines. It is also believed apparent that the subject matter of this invention is equally applicable to all types of internal combustion engines and particularly the invention would be applicable to being utilized in connection with diesel engine operations wherein fuel is injected and exploded by the heat of the fluid being compressed, with it being apparent that the charge could be injected through the member 32.

It is also to be understood that certain conventional details of construction which do not pertain to the invention per se have been eliminated for the sake of clarity. An example of the known construction so eliminated is the detailed presentation of conventional sealing rings that would obviously be employed between the piston and circular walls for the purpose of providing a sealing effect in known manner.

While a full and complete description of the invention has been set forth in accordance with the dictates of the Patent Statutes, it is to be understood that the invention is not intended to be limited to the specific embodiment herein shown.

Accordingly, modifications of the invention may be resorted to without departing from the spirit hereof or the scope of the appended claims.

What is claimed is:

1. A combustion engine of the character described, comprising:
   (A) a combustion chamber having inlet and exhaust ports and further including an auxiliary chamber;
   (B) a primary piston
       (1) reciprocable in said combustion chamber between upper and lower positions and
       (2) having a top surface;
   (C) a secondary piston
       (1) slidably positioned above said primary piston in said combustion chamber and
       (2) having imperforate upper and lower surfaces and
       (3) being shiftable between upper and lower positions;
   (D) ignition means
       (1) adapted to ignite gases trapped between said primary and secondary pistons when the same are in said upper positions
           (a) whereby said primary piston will be driven downwardly in a power stroke;
   (E) and bypass means carried by said primary piston and said combustion chamber
       (1) diverting a portion of said ignited gases out of said combustion chamber and against the upper surface of said secondary piston following a predetermined amount of downward movement of said primary piston in said power stroke
           (a) whereby said diverted gases propel said secondary piston downwardly during said downward stroke
   (F) means disposed on one of said pistons maintaining a spaced relationship between said lower surface of said secondary piston and said upper surface of said primary piston.

2. The device of claim 1 further characterized by the fact that said by-pass means include
   (A) an angular opening connecting the top surface of said primary piston with the peripheral edge thereof;
   (B) and a conduit
       (1) having one end opening into said auxiliary chamber at a point above the top surface of said secondary piston when the same is positioned in its upper position and
       (2) having the other end thereof opening into said combustion chamber for registry with said peripheral opening during said power stroke 3. The device of claim 1 further characterized by the fact that said exhaust port opens into said combustion chamber above said top surface of said primary piston when said piston is in its lower position whereby said secondary piston sweeps said ignited gases out of said exhaust port during said downward movement thereof that occurs during said power stroke of said primary piston.

4. The device of claim 1 further characterized by the fact that the presence of a spring loaded valve in said inlet port with said valve being movable between seated and unseated positions and being normally seated to close off said inlet port while being movable to unseated position in response to suction forces created by downward movement of said secondary piston said secondary piston automatically draws in a new charge of fuel from said inlet port during said downward movement thereof that occurs during said power stroke of said primary piston.

5. The device of claim 1 further characterized by the presence of relief means adapted to relieve the propelling force of said diverted gas following completion of said power stroke by said primary piston.

6. The device of claim 1 further characterized by the fact that
   (A) said combustion chamber has an offset portion disposed adjacent its upper end; and
   (B) said secondary piston has an undercut portion on its lower surface for registry with said offset portion of said combustion chamber, whereby compressed fuel may be diverted into the space between said primary and secondary pistons during upward movement thereof.

7. The device of claim 1 wherein
   (A) said exhaust port opens into said combustion chamber above said top surface of said primary piston when said piston is in its lower position; and
   (B) a spring loaded valve is disposed in said inlet port with said valve being movable between seated and unseated positions and being normally seated to close off said inlet port while being movable to unseated position in response to suction forces created by downward movement of said secondary piston (1) whereby said secondary piston sweeps said ignited gases out of said exhaust port during said downward movement thereof that occurs during said power stroke of said primary piston while simultaneously automatically drawing in a new charge of fuel through said inlet port.

3. The device of claim 1 wherein
(A) said secondary piston contacts said primary piston when said secondary and said primary pistons are at their lower positions; and
(B) said inlet port being disposed above said secondary piston when said secondary piston is at its lower position; and
(C) said primary and secondary pistons move upwardly in unison
   (1) whereby said primary and secondary pistons compress the gas in said chamber during their upward movement.

References Cited by the Examiner

UNITED STATES PATENTS

| | | | |
|---|---|---|---|
| 895,184 | 8/08 | Kelly | 123—66 |
| 1,586,342 | 1/26 | MacFarlane | 123—66 |

FOREIGN PATENTS

| | | |
|---|---|---|
| 384,598 | 2/08 | France. |

FRED E. ENGELTHALER, *Primary Examiner.*